Patented Mar. 15, 1949

2,464,397

UNITED STATES PATENT OFFICE 2,464,397

MANUFACTURING TETRAETHYL LEAD

George Edward Holbrook, Wilmington, Del., assignor to E. I. du Pont de Nemours & Company, Wilmington, Del., a corporation of Delaware No Drawing. Application July 4, 1945, Serial No. 603,257

14 Claims. (Cl. 260—437)

1

This invention relates to a process for manufacturing tetraethyl lead and more particularly to accelerating the reaction of lead monosodium alloy with ethyl chloride.

In the usual commercial process for manufacturing tetraethyl lead, ethyl chloride is reacted with lead monosodium alloy in a closed vessel under pressure at about 65° C. to about 85° C. In this process, it ordinarily requires 5 or more hours to complete the reaction. In recent years, it has become important to very greatly increase the production of tetraethyl lead. In order to increase such production materially, it has become important and desirable to greatly decrease the time for carrying the reaction to completion. When it has been attempted to decrease the time of reaction in the old processes, the yield of tetraethyl lead from a given batch of alloy is materially decreased.

An object of the present invention is to provide a process whereby the speed of initiating the reaction is materially increased without a substantial decrease in the yield. Another object is to provide a process whereby the time for completion of the reaction may be greatly decreased with a resulting large increase in the production of tetraethyl lead with the same equipment. Other objects are to advance the art. Still other objects will appear hereinafter.

The above and other objects may be accomplished in accordance with my invention which comprises carrying out the reaction of ethyl chloride on lead monosodium alloy in the presence of a small proportion, sufficient to accelerate the reaction, of a non-quinonoid ketone consisting of carbon, hydrogen, oxygen and from 0 to 2 halogen atoms. I have found that such ketones are extremely effective accelerators for this reaction increasing the speed of the reaction to such an extent that the time required for completion of the reaction is reduced to less than two hours. At the same time, high yields of tetraethyl lead are obtained. Thereby, the time of reaction in the production of tetraethyl lead in a plant is very materially shortened and the output increased.

The quinonoid ketones, such as quinone and 1,4-naphthaquinone appear to be ineffective for the purposes of my invention. On the other hand, the non-quinonoid ketones, such as the aliphatic ketones and the aromatic ketones in which the carbonyl carbon is outside of a benzene ring, are effective accelerators of the reaction.

I have found that the members of the class of aliphatic ketones are particularly effective for

2 accelerating the reaction. In the phrase "aliphatic ketone," I employ the term "aliphatic" in its strict sense which excludes aromatic and like substituents. The ketones may be saturated or unsaturated. They may contain hydroxy and carboxylic ester groups and up to 2 halogen atoms. Both the monoketones and the diketones are satisfactory. Preferably, the aliphatic ketones will contain from 3 to 9 carbon atoms. Also, the monoketones, containing a single oxygen atom, are preferred.

While acetone has generally proved to be the most effective and desirable compound for this purpose, other ketones, which have given satisfactory results, are: diisopropyl ketone, acetyl methyl carbinol, chloroacetone, p-chloroacetophenone, 1-chlorobutanone-2, diacetone, diacetyl, sym-dichloroacetone, p,p'-dichlorobenzophenone, diethyl ketone, diisobutyl ketone, di-n-propyl ketone, ethyl isopropyl ketone, isofenchone, mesityl oxide, methyl n-amyl ketone, methyl isobutyl ketone, methyl ethyl ketone, methyl n-propyl ketone, phenacyl chloride, phorone, pinacolone, acetylacetone, α-naphthylmethyl ketone, dibenzyl ketone, camphor, phenacyl bromide, isophorone, ethylacetoacetate, propiophenone, cyclohexanone, benzophenone, acetonyl acetone, diacetone alcohol, benzalacetophenone, benzalacetone, acetophenone and cinnamalacetophenone.

The amount of the ketone employed may be varied widely and will depend upon the conditions employed and particularly on the size of the batches and the equipment. With increasing concentrations of the ketones, their effectiveness will increase to an optimum and then gradually decrease with an increase in concentration above the optimum. In most cases, the optimum results are obtained with less than 1% of the ketone and hence the ketones will generally be employed in the proportion of from about 0.005% to about 1.0% based on the ethyl chloride. With aliphatic ketones employed in large scale plant operations carried out in an autoclave, the optimum results will usually be obtained with the ketone in a concentration of 0.5% or less. The aromatic ketones usually can be employed in larger proportions than the aliphatic ketones and their optimum concentration is generally higher, sometimes rising as high as 1.5%. Usually in small scale production in a bomb, larger amounts of the ketones will be effective and may even be desirable. For example, in laboratory scale experiments, acetone and chloroacetone have been found to be effective in proportions as high as 3% and 4%, respectively, based on the ethyl chloride. It should also be noted that the optimum concentration will vary with the individual ketone and with the conditions employed.

While the ketone may be added to the reactants or the reaction vessel in different ways, it will generally be most desirable to add the ketone to the ethyl chloride prior to mixing the ethyl chloride with the alloy.

In order to more clearly illustrate my invention, preferred modes of carrying the same into effect and the advantageous results to be obtained thereby, the following examples are given:

Example I 100 grams of ground lead-sodium alloy (containing 10.0% sodium) were charged into each of six steel bombs having a capacity of 150 ml. Fifty milliliters of ethyl chloride were added to each bomb and 0.3 ml. of acetone were added to each of three of them. The bombs were closed and tumbled in a water-bath maintained at 85° C. for 90 minutes. After the heating period, the hot water was drained and the bath was refilled with cold water. After 15 minutes, the bombs were removed and placed on ice. The amount of tetraethyl lead in each reaction mass was determined by known methods. The yield, in the three bombs containing acetone, averaged 89.04% while the yield, in the other three, averaged 80.18% of theory based on the lead-sodium alloy.

Example II 212 parts of ground lead monosodium alloy were charged into a suitable agitated, water-jacketed autoclave. The alloy was heated by the circulation of warm (35 to 55° C.) water in the jacket until a temperature of 35 to 50° C. was attained. 100 parts of ethyl chloride, containing 0.075% of acetone, were then added over a period of 45 minutes. The reaction mass was then stirred for one hour and forty-five minutes at about 65 to 75° C. The charge was removed from the autoclave and the tetraethyl lead was recovered in the usual manner. The yield obtained was about 2% higher than the yields realized in control runs made under identical conditions except that a ketone was not used.

Example III

A run was made similar to Example II except that 0.125% of methyl ethyl ketone was substituted for the acetone. A corresponding acceleration of the reaction was obtained.

Example IV

A run was made similar to Example II except that 0.15% of methyl isobutyl ketone was substituted for the acetone. A corresponding acceleration of the reaction was obtained.

Example V

A run was made similar to Example I except that 0.4 ml. of monochloroacetone was substituted for the 0.3 ml. of acetone. The yields, in the bombs containing the monochloroacetone, averaged 89.40%, while the yields in the other three averaged 78.40%.

Example VI

A run was made similar to Example I except that 1.26 grams of p,p'-dichlorobenzophenone was substituted for the acetone. The yields, in the three bombs containing p,p'-dichlorobenzophenone, averaged 81.93% while the yields in the other three averaged 76.54%.

It will be understood that the above examples are given for illustrative purposes solely and that my invention is not to be limited to the specific embodiments disclosed, but that my invention may be modified in various respects without departing from the spirit or scope thereof. For example, other ketones within the class hereinbefore defined may be employed in place of those specifically mentioned. Accordingly, my invention is not to be limited to the specific embodiments disclosed but I intend to cover it broadly as in the appended claims.

I claim:

1. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of a ketone in which each carbonyl carbon is doubly bonded to an oxygen atom, forms no part of a benzene ring, and is singly bonded to each of two different carbon atoms, and which ketone is a member of the group consisting of ketones consisting of carbon, hydrogen and oxygen, the oxygen being keto, hydroxyl and acyclic ester oxygen solely, and corresponding monohalogen and di-halogen substituted ketones.

2. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of a ketone in which each carbonyl carbon is doubly bonded to an oxygen atom, forms no part of a benzene ring, and is singly bonded to each of two different carbon atoms, and which ketone consists of carbon, hydrogen and oxygen, the oxygen being keto, hydroxyl and acyclic ester oxygen solely.

3. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of an aliphatic ketone in which each carbonyl carbon is doubly bonded to an oxygen atom and is singly bonded to each of two different carbon atoms, and which ketone consists of carbon, hydrogen and oxygen, the oxygen being keto, hydroxyl and acyclic ester oxygen solely.

4. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of an aliphatic ketone of from 3 to 9 carbon atoms in which each carbonyl carbon is doubly bonded to an oxygen atom and is singly bonded to each of two different carbon atoms, and which ketone consists of carbon, hydrogen and oxygen, the oxygen being keto, hydroxyl and acyclic ester oxygen solely.

5. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of an aliphatic ketone containing a carbonyl carbon doubly bonded to an oxygen atom and singly bonded to each of two different carbon atoms and consisting of carbon, hydrogen and the single oxygen.

6. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of an aliphatic ketone of from 3 to 9 carbon atoms containing a carbonyl carbon doubly bonded to an oxygen atom and singly bonded to each of two different carbon atoms and consisting of carbon, hydrogen and the single oxygen.

7. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of a ketone in which each carbonyl carbon is doubly bonded to an oxygen atom, forms no part of a benzene ring, and is singly bonded to each of two different carbon atoms, and which ketone consists of carbon, hydrogen, oxygen and 1 to 2 halogen atoms, the oxygen being keto, hydroxyl and acyclic ester oxygen solely.

8. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of a ketone in which each carbonyl carbon is doubly bonded to an oxygen atom, forms no part of a benzene ring, and is singly bonded to each of two different carbon atoms, and which ketone consists of carbon, hydrogen, oxygen and 1 to 2 chlorine atoms, the oxygen being keto, hydroxyl and acyclic ester oxygen solely.

9. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of an aliphatic ketone in which each carbonyl carbon is doubly bonded to an oxygen atom and is singly bonded to each of two different carbon atoms, and which ketone consists of carbon, hydrogen, oxygen and 1 to 2 halogen atoms, the oxygen being keto, hydroxyl and acyclic ester oxygen solely.

10. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of an aliphatic ketone in which each carbonyl carbon is doubly bonded to an oxygen atom and is singly bonded to each of two different carbon atoms, and which ketone consists of carbon, hydrogen, oxygen and 1 to 2 chlorine atoms, the oxygen being keto, hydroxyl and acyclic ester oxygen solely.

11. In the process of making tetraethyl lead by the reaction of ethyl chloride on lead monosodium alloy, the improvement which comprises carrying out the reaction in the presence of from about 0.005% to about 4% by weight based on the ethyl chloride, sufficient to accelerate the reaction, of an aliphatic ketone of from 3 to 9 carbon atoms in which each carbonyl carbon is doubly bonded to an oxygen atom and is singly bonded to each of two different carbon atoms, and which ketone consists of carbon, hydrogen, oxygen and 1 to 2 chlorine atoms, the oxygen being keto, hydroxyl and acyclic ester oxygen solely.

12. In the process of making tetraethyl lead by the reaction of ethyl chloride on lead monosodium alloy, the improvement which comprises carrying out such reaction in the presence of from about 0.005% to about 4% by weight based on the ethyl chloride, sufficient to accelerate the reaction, of monochloroacetone.

13. In the process of making tetraethyl lead by the reaction of ethyl chloride on lead monosodium alloy, the improvement which comprises carrying out such reaction in the presence of from about 0.005% to about 4% by weight based on the ethyl chloride, sufficient to accelerate the reaction, of benzalacetophenone.

14. In the process of making tetraethyl lead by the reaction of ethyl chloride on lead monosodium alloy, the improvement which comprises carrying out such reaction in the presence of from about 0.005% to about 4% by weight based on the ethyl chloride, sufficient to accelerate the reaction, of acetone.

GEORGE EDWARD HOLBROOK.

REFERENCES CITED

The following references are of record in the file of this patent:

UNITED STATES PATENTS

| Number | Name | Date |
| --- | --- | --- |
| 1,622,228 | Midgley et al. | Mar. 22, 1927 |
| 1,645,389 | Monroe | Oct. 11, 1927 |
| 1,697,245 | Kraus et al. | Jan. 1, 1929 |
| 1,717,961 | Daubt | June 18, 1929 |

OTHER REFERENCES

Staudinger, "Die Ketene" (1912), pages 1 and 2.
Barnett, "Anthracene and Anthraquinone," (1921), page 77.
Houben, "Das Anthracen und die Anthrachinone," (1929), page 208.